(12) United States Patent
Liebl et al.

(10) Patent No.: US 6,236,917 B1
(45) Date of Patent: May 22, 2001

(54) OPEN ARCHITECTURE DIAGNOSTIC TOOL

(75) Inventors: Troy J. Liebl; Kurt R. Raichle, both of Owatonna, MN (US)

(73) Assignee: SPX Corporation, Muskegon, MI (US)

( * ) Notice: Subject to any disclaimer, the term of this patent is extended or adjusted under 35 U.S.C. 154(b) by 0 days.

(21) Appl. No.: 09/468,231

(22) Filed: Dec. 21, 1999

(51) Int. Cl.$^7$ .................................................. G06F 17/40
(52) U.S. Cl. .................................. 701/29; 701/33; 701/35
(58) Field of Search .................................. 701/2, 29, 24, 701/33, 34, 35; 73/116, 117.3

(56) References Cited

U.S. PATENT DOCUMENTS

| | | |
|---|---|---|
| 4,739,323 | 4/1988 | Miesterfeld et al. . |
| 4,962,456 | 10/1990 | Abe et al. . |
| 4,975,846 | 12/1990 | Abe et al. . |
| 4,975,847 | 12/1990 | Abe et al. . |
| 5,003,477 | 3/1991 | Abe et al. . |
| 5,056,023 | 10/1991 | Abe . |
| 5,132,905 | 7/1992 | Takai et al. . |
| 5,150,048 | 9/1992 | McAuliffe et al. . |
| 5,319,962 | 6/1994 | Kaminski et al. . |
| 5,416,917 | 5/1995 | Adair et al. . |
| 5,442,553 | 8/1995 | Parrillo . |
| 5,459,660 | 10/1995 | Berra . |
| 5,555,498 | 9/1996 | Berra et al. . |
| 5,737,711 | 4/1998 | Abe . |
| 5,815,071 | 9/1998 | Doyle . |
| 5,848,064 | 12/1998 | Cowan . |
| 5,884,202 | 3/1999 | Arjomand . |
| 5,916,258 * | 6/1999 | Seashore et al. ...................... 701/33 |
| 5,916,287 * | 6/1999 | Arjomand et al. ..................... 701/29 |
| 5,922,037 | 7/1999 | Potts . |
| 6,134,488 * | 10/2000 | Sasaki et al. .......................... 701/33 |

FOREIGN PATENT DOCUMENTS

| | | |
|---|---|---|
| 1210844 | 8/1989 | (JP) . |
| 3111733 | 5/1991 | (JP) . |
| 8136411 | 5/1996 | (JP) . |

\* cited by examiner

*Primary Examiner*—Richard M Camby
(74) *Attorney, Agent, or Firm*—Pepper Hamilton, LLP

(57) ABSTRACT

A diagnostic tool, for communicating with a plurality of motor vehicle control units, includes a processor, a main memory and a non-volatile storage device. The processor executes an operating system and a plurality of diagnostic applications. The non-volatile storage device is coupled to the processor and stores the operating system and the plurality of diagnostic applications. Each of the diagnostic applications is compiled and linked separately from the operating system. Each of the diagnostic applications is also separately downloadable into the storage device of the diagnostic tool. The diagnostic applications when executed by the processor function to provide at least one message to one of the control units and to receive control unit information from one of the control units in response to the at least one message.

18 Claims, 2 Drawing Sheets

OPEN ARCHITECTURE DIAGNOSTIC TOOL

BACKGROUND OF THE INVENTION

The present invention is directed to a diagnostic tool for a motor vehicle and more specifically to a diagnostic tool that implements an open architecture to accommodate new features.

Today, motor vehicles include various electronic control units mounted in the vehicle. The control units may control various systems and/or subsystems within the vehicle. For example, a control unit may control an engine, the transmission, brakes or the steering mechanism. These control units are typically coupled to a variety of sensors and/or actuators.

Handheld diagnostic tools have been utilized to troubleshoot faults associated with these control units. A typical diagnostic tool has included a microcontroller and an interface circuit to facilitate communication between the microcontroller and the control units in the vehicle. Such tools have also included a non-volatile memory (either internally or externally, i.e., a plug-in module, or both) that stored various routines to enable the tool to communicate with a user and the control units within the vehicle. These routines have been individually compiled and then linked to produce an executable binary, which was then downloaded into the tool's non-volatile memory. In tools using this approach, when one routine required changing or a new diagnostic routine was to be added, each routine was again compiled and linked with the other routines before being downloaded (as a whole) into the tool's non-volatile memory.

Various manufacturers have also marketed handheld computers for non-automotive applications. For example, a personal information manager (PIM) is a pen-based computer that has typically be utilized as a calendar and/or an address book. A personal digital assistant (PDA) or handheld personal computer (HPC) is a handheld device that combines computing, telephone, facsimile and networking features. PDAs and HPCs have normally included an operating system that is compiled and linked separately from any applications. For example, the Windows CE operating system (which is similar to Windows 95) has been implemented in some PDAs. An example of a real-time operating system (RTOS) that has seen some use in handheld computers is the Lynx operating system (LynxOS). The LynxOS is compatible with industry software standards, such as UNIX, and functions on a fairly broad range of hardware platforms (e.g., Intel, IBM, Motorola and Sun Microsystems).

While various handheld devices have utilized an operating system, no motor vehicle diagnostic tool has included an operating system that is compiled and linked separately from a plurality of diagnostic applications (routines).

SUMMARY OF THE INVENTION

An embodiment of the present invention is directed to a diagnostic tool for communicating with a plurality of motor vehicle control units. The diagnostic tool includes a processor, a main memory and a non-volatile storage device. The processor executes an operating system and a plurality of diagnostic applications. The non-volatile storage device is coupled to the processor and stores the operating system and the plurality of diagnostic applications. Each of the diagnostic applications is compiled and linked separately from the operating system and are separately downloadable into the storage device of the diagnostic tool. The diagnostic applications, when executed by the processor, function to provide at least one message to one of the control units and to receive control unit information from one of the control units in response to the at least one message.

These and other features, advantages and objects of the present invention will be further understood and appreciated by those skilled in the art by reference to the following specification, claims and appended drawings.

DETAILED DESCRIPTION OF THE INVENTION

A diagnostic tool, according to the present invention, provides a readily upgradeable diagnostic tool that, unlike prior art diagnostic tools, is capable of downloading new or upgraded diagnostic routines separately. Thus, a manufacturer can utilize a smaller plug-in non-volatile memory module when supplying updated routines to a customer. This can reduce the cost of supplying updated diagnostic routines for both the manufacturer and the customer. As previously discussed, prior art diagnostic tools required compiling, linking and downloading of all software associated with the diagnostic tool when a single diagnostic routine was added or modified. In contrast, the diagnostic tool of the present invention includes an operating system and a plurality of diagnostic applications. Each of the diagnostic applications is compiled and linked separately from the operating system and are separately downloadable into the non-volatile storage device (e.g., non-volatile memory) of the diagnostic tool. One of ordinary skill in the art will readily appreciate that the applications could also be downloaded to a disk, cassette, or other storage media, if desired.

Figure 1:
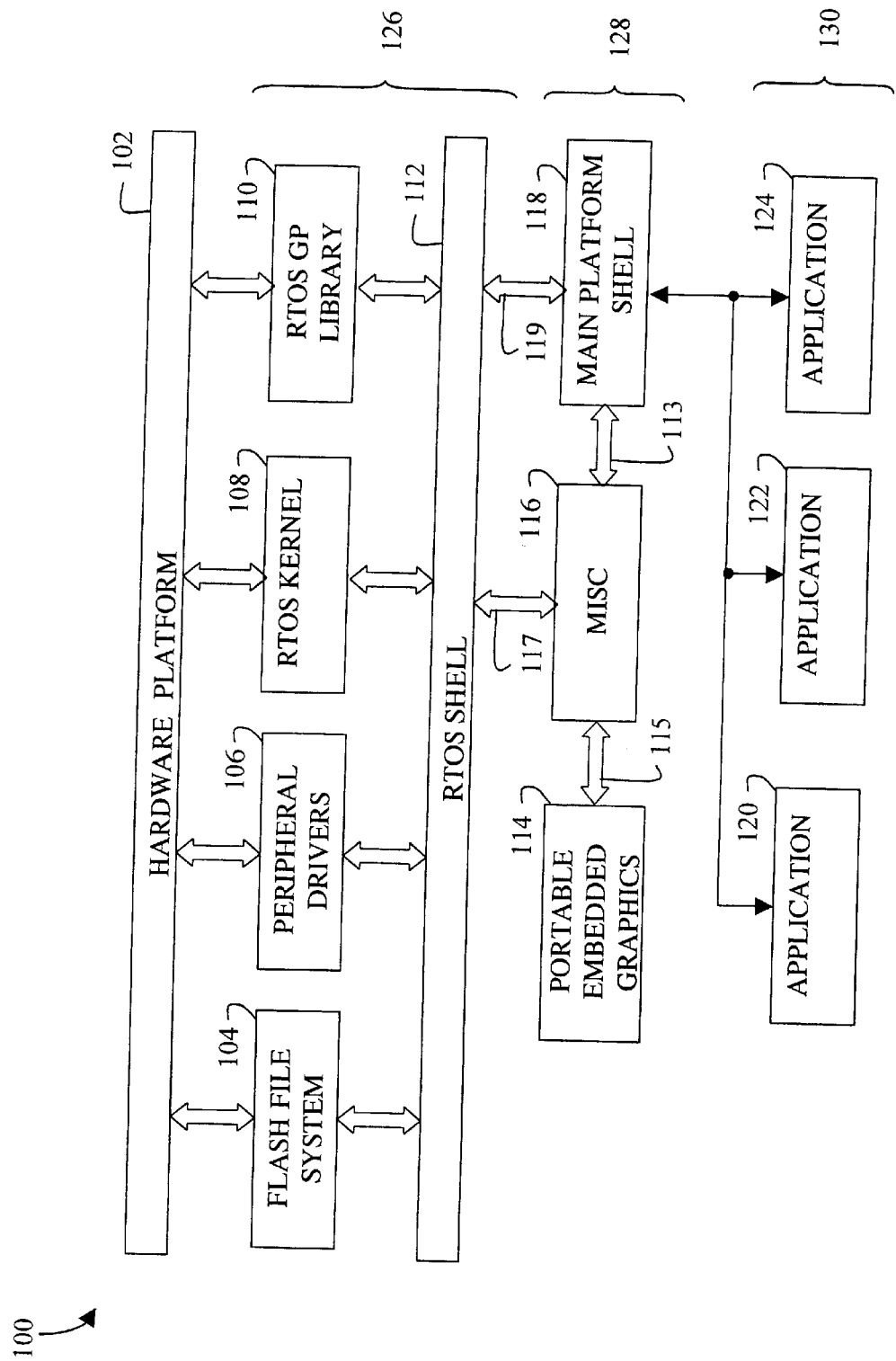
FIG. 1 is a block diagram showing the interrelationship between a hardware platform and a software platform of a diagnostic tool, embodying the present invention.

FIG. 1 is a block diagram depicting various software modules communicating with a hardware platform 102, according to an embodiment of the present invention. Hardware platform 102 can be based on, for example, an Intel, IBM, Motorola or Sun Microsystems platform. Preferably, hardware platform 102 is a Motorola platform that utilizes a MPC823 processor. The software modules include a flash file system module 104 that controls reads/writes to internal and/or external flash memory. Another software module coupled to hardware platform 102 is a peripheral driver module 106 that includes drivers for controlling various peripherals. For example, module 106 may include a printer driver that controls the printing of information by a printer that is coupled (e.g., through a printer port (not shown)) to hardware platform 102. A real-time operating system (RTOS) kernel module 108 and an RTOS general purpose library module 110 are also coupled to hardware platform 102.

RTOS kernel module 108 is a central module of real-time operating system (RTOS) 126. Kernel 108 is the part of RTOS 126 that loads first and remains in main memory (i.e., RAM). Because it stays in main memory it is desirable that kernel 108 be designed to be as small as possible, while still providing all the essential functions required by each application and other parts of RTOS 126. In a typical implementation, kernel 108 is responsible for memory, process and task management.

Figure 2:
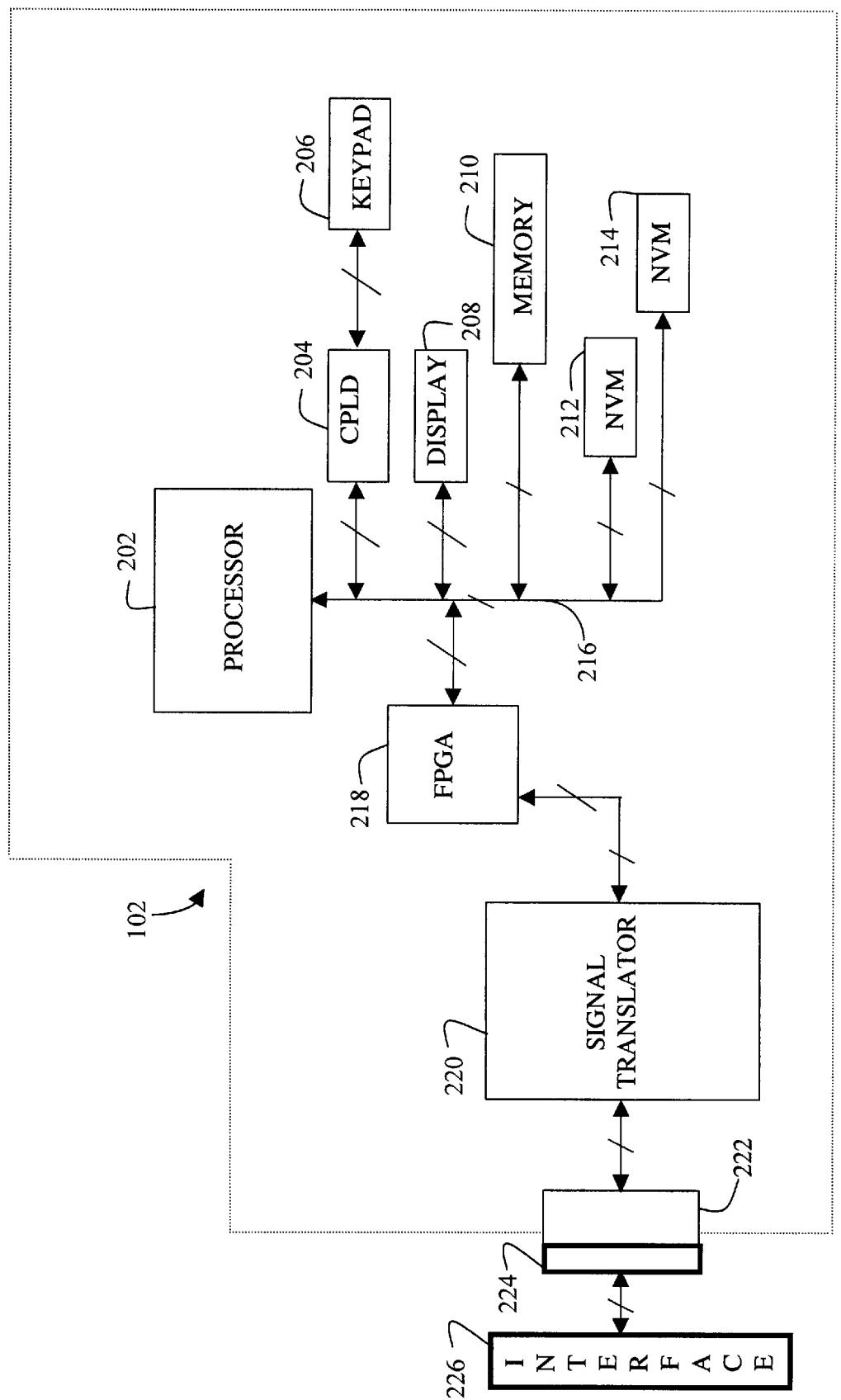
FIG. 2 is an electrical circuit diagram in block form of an exemplary hardware platform, embodying the present invention.

An RTOS shell 112 provides an intermediate interface between a diagnostic technician and flash file system module 104, peripheral driver module 106, RTOS kernel module 108 and RTOS general purpose library module 110. Miscellaneous module 116 and main platform shell module 118 also communicate with the RTOS shell 112. Main platform shell module 118 may include an application manager module, a help module, a date/time setup module and/or various other utility modules, which provide a custom user interface (e.g., a menu or a graphical user interface (GUI)) for the diagnostic technician. Miscellaneous module 116 can include, for example, routines for date/time setup, contrast control of a display (if implemented), a printer setup and application loading. A portable embedded graphics module 114 communicates with miscellaneous module 116 and can provide various embedded graphics to the technician through a display 208 (FIG. 2). Miscellaneous module 116 also receives/provides information from/to main platform shell module 118 which also provides an interface between applications 130 and RTOS 126. Customized modules 128 include main platform shell module 118, miscellaneous module 116 and portable embedded graphics module 114 coupled to each other and shell 112 by interfaces 113, 115, 117 and 119.

Main platform shell module 118 is capable of launching applications 120, 122 and 124 (collectively, applications 130). While only three applications are shown for brevity, one of ordinary skill in the art will appreciate that more applications can be implemented. Applications 130 include various diagnostic routines (e.g., Pathfinder 99, ABS 2000, Import 2000, etc.). As discussed above, RTOS 126 includes flash file system module 104, peripheral driver module 106, RTOS kernel module 108, RTOS general purpose library module 110 and RTOS shell module 112. In a preferred embodiment, RTOS 126 is a Lynx operating system (LynxOS) designed by the Lynx Corporation. In a preferred embodiment, applications 120, 122 and 124 are loaded into an internal flash memory under the control of main platform shell module 118, RTOS shell module 112 and flash file system module 104. Miscellaneous module 116 may also include a file management system module. RTOS 126 can utilize the file management system module to organize and keep track of various files. The file management system module can, for example, implement a hierarchical file system (i.e., a file system that uses directories to organize files into a tree structure).

In FIG. 2, a diagnostic tool 102 is shown that, according to an embodiment of the present invention, includes a processor 202 coupled to a selectable multiple protocol interface 218. In the preferred embodiment, selectable multiple protocol interface 218 is a field programmable gate array (FPGA) as is disclosed in U.S. patent application Ser. No. 09/468,697, entitled "Multi-Vehicle Communication Interface," by David A. Reul et al., filed Dec. 21, 1999, assigned to the assignee of the present invention, which is hereby incorporated by reference. The present invention can also be implemented within a diagnostic system that includes a wireless communication module and a remote station.

As shown in FIG. 2, FPGA 218 is coupled to a selectable signal translator 220. Translator 220 is coupled to a motor vehicle communication interface 226 through a connector 222 and an existing vehicle diagnostic connector 224 by an external cable (not shown) that is typically motor vehicle dependent. Translator 220 conditions signals received from a control unit (control unit information) to a conditioned signal compatible with diagnostic tool 102. For example, the J1850 variable pulse width modulation (VPWM) standard requires a high level signal to be between 4.25 and 20 volts and a low level signal to be between ground and 3.5 volts. In a typical 3.3 volt implementation, diagnostic tool 102 would require a high level signal to be between about 2.64 and 3.3 volts and a low level signal to be between ground and about 0.66 volts. Thus, translator 220 converts a received signal to a voltage level appropriate for diagnostic tool 102. In a similar manner, translator 220 translates a signal (message) that is being transmitted from diagnostic tool 102 to a control unit, to an appropriate voltage level. In addition to translating J1850 signals, translator 220 can translate signals for ISO 9141, communication collision detection (CCD), data communication links (DCL), serial communication interface (SCI), S/F codes, a solenoid drive, J1708, RS232, controller area network (CAN), a 5 volt I/O, a diagnostic enable and an analog-to-digital (A/D) converter.

Circuitry for translating a signal from one voltage level to another is well known to those of ordinary skill in the art. In the preferred embodiment, translator 220 includes circuitry to translate all signal voltage levels currently implemented within a motor vehicle. As such, the circuitry to translate a particular communication protocol's voltage levels is selected by FPGA 218 (e.g., by tri-stating unused transceivers) or by providing a keying device that plugs into connector 222 that is provided by diagnostic tool 102 to connect diagnostic tool 102 to vehicle communication interface 226. Translator 220 can perform other signal conditioning (e.g., filtering a signal) if desired.

FPGA 218 transmits to and receives signals from a motor vehicle control unit through translator 220. FPGA 218 provides an appropriate signal to selectable signal translator 220 so that a received or transmitted signal is translated, as previously discussed above, according to the communication protocol implemented by the motor vehicle control unit.

FPGA 218 is coupled to processor 202 through various address, data and control lines of a system bus 216. As is discussed in the above-referenced U.S. patent application entitled "Multi-Vehicle Communication Interface", FPGA 218 provides a multiple communication protocol interface between processor 202 and a motor vehicle control unit. In the preferred embodiment, FPGA 218 is a 10K50E manufactured by the Altera Corporation. The multiple communication protocol interface converts data from a communication protocol implemented by a motor vehicle control unit into a processor readable format. In this manner, processor 202 can read error codes from a control unit and provide test signals to a control unit, such that various actuators and/or sensors within a motor vehicle can be tested.

Processor 202 is also coupled to a display 208 and to a complex programmable logic device (CPLD) 204, through system bus 216. CPLD 204 provides decoding logic for keypad 206 and also provides glue-logic for various other interfacing tasks. Processor 202 is programmed to provide output to a user through display 208 and receive input from the user through a keypad 206. Processor 202 runs selected communication applications (routines) to communicate with selected motor vehicle control units. In the preferred embodiment, these routines are separately downloadable into an internal memory of diagnostic tool 102. Preferably, processor 202 is a MPC823 manufactured by the Motorola Corporation.

A memory subsystem 210, an internal non-volatile memory 212 and an external non-volatile memory 214 are coupled to system bus 216. Memory subsystem 210 includes an application dependent amount of main memory, i.e., dynamic random access memory (DRAM), and read-only memory (ROM). Internal non-volatile memory 212 and external non-volatile memory 214 can be an electrically erasable programmable read-only memory (EEPROM) or a flash read-only memory (ROM). Internal non-volatile memory 212 can provide storage for boot code, an operating system, diagnostic applications, self-diagnostics, various drivers and space for FPGA images, if desired. External non-volatile memory 214 typically provides for storage of updated programs (operating system modules or diagnostic applications) or data (e.g., diagnostic trouble codes (DTCs)). This allows a user to transfer new applications into diagnostic tool 102 or transfer data from diagnostic tool 102 without utilizing an external communication link (e.g., a universal serial bus (USB) port). Memory 212 and/or memory 214 can also contain downloadable images (so that FPGA 218 can be reconfigured for a different group of communication protocols).

In summary, a diagnostic tool according to the present invention is capable of communicating with a plurality of motor vehicle control units. The diagnostic tool includes an operating system and a plurality of diagnostic applications. Each of the diagnostic applications is compiled and linked separately from the operating system. As such, the diagnostic applications are separately downloadable into a non-volatile storage device of the diagnostic tool.

The above description is considered that of the preferred embodiment only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. A diagnostic tool for communicating with a plurality of motor vehicle control units, the diagnostic tool comprising:
   a processor for executing an operating system and a plurality of diagnostic applications;
   a main memory coupled to the processor; and
   a non-volatile storage device coupled to the processor, the storage device storing the operating system and the plurality of diagnostic applications, wherein each of the diagnostic applications is compiled and linked separately from the operating system, and wherein each of the diagnostic applications is separately downloadable into the storage device of the diagnostic tool, the diagnostic applications when executed by the processor functioning to provide at least one message to one of the control units and to receive control unit information from one of the control units in response to the at least one message.

2. The diagnostic tool of claim 1, wherein the non-volatile storage device is a flash ROM.

3. The diagnostic tool of claim 1, wherein the non-volatile storage device is an EEPROM.

4. The diagnostic tool of claim 1, further including:
   a plug-in module providing revised diagnostic applications for downloading into the non-volatile storage device of the diagnostic tool.

5. The diagnostic tool of claim 1, further including:
   a keypad coupled to the processor for receiving input from a user, the user initiating one of the diagnostic applications by entering a selection; and
   a display coupled to the processor for displaying the results provided by the initiated diagnostic application.

6. The diagnostic tool of claim 1, further including:
   a selectable multiple protocol interface coupled between the plurality of motor vehicle control units and the processor, the selectable multiple protocol interface converting the at least one message from the processor into a format readable by a selected motor vehicle control unit and converting received control unit information into a format readable by the processor.

7. The diagnostic tool of claim 6, wherein the selectable multiple protocol interface is a field programmable gate array (FPGA).

8. The diagnostic tool of claim 7, further including:
   a selectable signal translator coupled between the plurality of motor vehicle control units and the FPGA, the selectable signal translator conditioning the messages from the processor or the control unit information from the selected motor vehicle control unit to a conditioned signal compatible with the selected motor vehicle control unit or the processor, respectively.

9. The diagnostic tool of claim 1, wherein the selectable multiple protocol interface is a J1850 channel module that includes conversion circuitry for J1850 variable pulse width modulation (VPWM) and J1850 pulse width modulation (PWM) communication protocols.

10. A method for providing an upgradeable diagnostic tool that includes an operating system and a plurality of diagnostic applications, the diagnostic tool communicating with a plurality of motor vehicle control units, the method comprising the steps of:
    providing a processor for executing the operating system and the plurality of diagnostic applications;
    providing a main memory coupled to the processor; and
    providing a non-volatile storage device coupled to the processor, the storage device storing the operating system and the plurality of diagnostic applications, wherein each of the diagnostic applications is compiled and linked separately from the operating system, and wherein each of the diagnostic applications is separately downloadable into the storage device of the diagnostic tool, the diagnostic applications functioning to provide at least one message to one of the control units and to receive control unit information from one of the control units in response to the at least one message.

11. The method of claim 10, wherein the non-volatile storage device is a flash ROM.

12. The method of claim 10, wherein the non-volatile storage device is an EEPROM.

13. The method of claim 10, further including the step of:
    providing a plug-in module, the plug-in module providing revised diagnostic applications for downloading into the non-volatile storage device of the diagnostic tool.

14. The method of claim 10, further including the steps of:
    providing a keypad, the keypad enabling a user to provide input to the processor, the user initiating one of the diagnostic applications by entering a selection; and
    providing a display, the display enabling the processor to provide output data to the user in response to the initiated diagnostic application.

15. The method of claim 10, further including the step of:
    providing a selectable multiple protocol interface coupled between the plurality of motor vehicle control units and the processor, the selectable multiple protocol interface converting the at least one message from the processor into a format readable by a selected motor vehicle control unit and converting received control unit information into a format readable by the processor.

16. The method of claim 15, wherein the selectable multiple protocol interface is a field programmable gate array (FPGA).

17. The method of claim 16, further including the step of:
providing a selectable signal translator coupled between the plurality of motor vehicle control units and the FPGA, the selectable signal translator conditioning the messages from the processor or the control unit information from the selected motor vehicle control unit to a conditioned signal compatible with the selected motor vehicle control unit or the processor, respectively.

18. The method of claim 10, wherein the selectable multiple protocol interface is a J1850 channel module that includes conversion circuitry for J1850 variable pulse width modulation (VPWM) and J1850 pulse width modulation (PWM) communication protocols.

* * * * *